United States Patent

[11] 3,607,519

| [72] | Inventors | Myron S. Beyer<br>Danville;<br>Stanley Manne, Markham; G. R. Ramagopal, Urbana, all of Ill. |
|---|---|---|
| [21] | Appl. No. | 658,764 |
| [22] | Filed | Aug. 7, 1967 |
| [45] | Patented | Sept. 21, 1971 |
| [73] | Assignee | Tee-Pak, Inc.<br>Chicago, Ill. |

[54] LAMINATION OF PLASTIC PACKAGING FILMS
9 Claims, 5 Drawing Figs.

[52] U.S. Cl. ............................................. 156/192,
156/190, 156/277, 156/322, 156/331, 156/332,
161/5, 161/190, 161/413
[51] Int. Cl. ....................................................... B32b 31/20,
B32b 31/12
[50] Field of Search........................................... 161/5, 190,
227, 231, 249, 252, 413; 156/277, 322, 331–332,
184, 192, 190; 260/858

[56] References Cited
UNITED STATES PATENTS

| 2,679,968 | 6/1954 | Richter.......................... | 156/190 X |
| 3,462,329 | 8/1969 | Beyer............................ | 156/190 |
| 3,490,972 | 1/1970 | Rogers.......................... | 156/192 X |
| 3,505,147 | 4/1970 | Eulie............................. | 156/322 X |

*Primary Examiner*—Harold Ansher
*Attorney*—Neal J. Mosely

ABSTRACT: Plastic film laminates for use in the packaging of food products and other materials are formed by adhesive lamination of polyethylene films to films such as nylon, polyester, cellophane, polypropylene, polyethylene, polyvinyl chloride, etc., by adhesive lamination. The polyethylene portion of the laminate provides for heat sealability of the resulting film laminate. The nylon, polyester, cellophane, polypropylene, etc., film gives flex strength, abrasion resistance, gloss, vacuum formability, barrier properties, etc., to the wound laminate. These film laminates are particularly useful in vacuum-forming packing machines and for manufacturing plastic pouches. In the manufacture of the film laminate, a pressure-sensitive but curable adhesive is applied to one of the plies of the film laminate on an ordinary plastic-film-printing press and the two films combined and rolled up on a windup reel. The pressure applied to the film laminate in the windup reel is the only laminating force applied to the film and the film laminate is cured simply by being stored under pressure of being wound on the rolls. After curing of the adhesive, the plastic film plies cannot be separated without being torn. If desired, the film to which the adhesive is applied may also be printed prior to application of the adhesive so that the resulting film laminate is provided with a desired imprint positioned between the film plies.

STANLEY MANNE
MYRON S BEYER
G. R. RAMAGOPAL
*INVENTOR.*

STANLEY MANNE
MYRON S BEYER
G. R. RAMAGOPAL
    INVENTOR.

BY their attorney

LAMINATION OF PLASTIC PACKAGING FILMS

BACKGROUND OF THE INVENTION

In the packaging of food products and other materials, there has recently been developed packaging machinery in which a plastic film is formed into a suitable pouch or pocket and filled with the material to be packaged. Another film is then laid down over the filled pouch or pocket and heat sealed around the periphery, with application of vacuum if desired. In this packaging technique, the films which are most suitable for thermal forming are difficult to heat seal and the films which are easily heat sealed generally have poor gas and vapor barrier properties. There has recently developed a demand for a laminated film consisting of a thermally formable film to which there is laminated a layer of a heat sealable film. One technique for the preparation of such a laminate involves the extrusion coating of a thermally formable film such as nylon or polyester or polypropylene with a heat-sealable film layer of polyethylene. Film laminates of this type have also been prepared using conventional film laminating processes. The preparation of film laminates either by extrusion coating or by lamination in a plastic-film-laminating press involves the use of very expensive equipment which has heretofore restricted the preparation of film laminates to manufacturers having such lamination or extrusion coating equipment. This has generally meant that only the larger plastic film manufacturers could manufacture film laminates. There has, therefore, arisen a substantial need for a process for lamination of plastic films on equipment readily available to the small scale film converter.

SUMMARY OF THE INVENTION

Plastic film laminates, suitable for use in vacuum packaging machinery, are prepared by applying a pressure-sensitive but curable adhesive to one ply of the desired laminate in an ordinary plastic-film-printing press. The adhesive coated film and the other film are combined and wound on a conventional storage roll under substantial tension. The force applied to the film laminate in being wound upon the storage roll is the only laminating force applied and after a period of storage the adhesive is set up so that the films cannot be separated without tearing. If desired, the film which is coated with adhesive may be provided with a suitable imprint or design on the printing press prior to application of the adhesive so that the imprint or design is positioned between the film plies and is thus protected from abrasive wear.

In carrying out this process, a film of polyethylene, which is heat sealable, is laminated to a film such as nylon, polyester, cellophane, polypropylene, or the like, to provide a film laminate having superior properties. Either or both of the films may be coated with a material such as saran which provides added vapor and oxygen barrier properties to the film laminate or the improved barrier properties may be obtained by incorporation of a saran polymer latex in the adhesive used to laminate the films.

The adhesive may be applied to one of the films and the films subsequently combined or the adhesive may be applied to the outermost ply of the 2ply film when fed through the printing press together. In either case, the film plies are wound up together on the storage reel and the adhesive binds the film on which it is coated to the adjacent film which it contacts.

DESCRIPTION OF THE PREFERRED EMBODIMENTS

Figure 1:
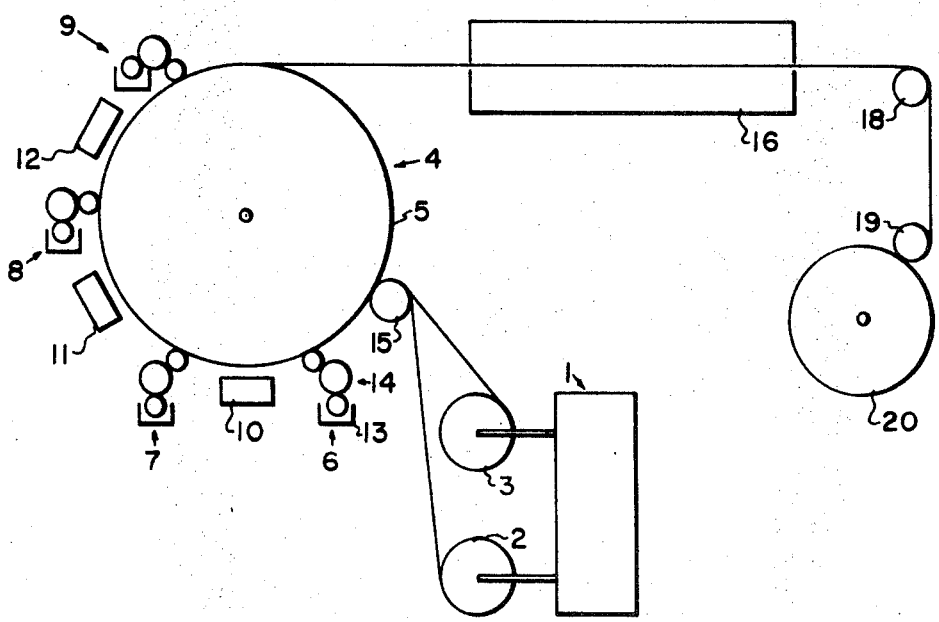
FIG. 1 is a schematic view of one preferred form of this invention in which a pair of film plies are fed through a press for application of an adhesive and lamination upon winding on a storage reel.
Figure 2:
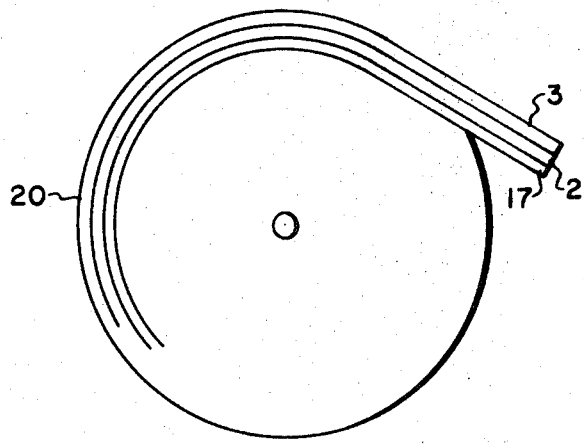
FIG. 2 is a detail end view of the laminated film on the storage reel of FIG. 1 showing the relationship of the laminated plies.

This invention comprises a new and improved process for lamination of dimensionally stable plastic films such as nylon, Mylar (polyester), cellophane, polypropylene, vinyl, etc., to a heat-sealable film such as polyethylene. The process of lamination is carried out using a printing press as the means for application of a laminating adhesive and the windup reel for the two film plies as the sole means of securing a tightly laminated film structure. The films which are to be laminated may be coated with saran (polyvinylidene chloride or a copolymer thereof) to provide vapor and oxygen or other gas barrier properties or the laminating adhesive may have a saran polymer latex incorporated therein to provide oxygen and water vapor barrier properties to the laminate. In FIGS. 1 and 2 of the drawing, the process of lamination which comprises a preferred embodiment of this invention is illustrated with respect to the printing of a pair of film plies on a printing press and subsequent lamination of the plies.

Referring to the drawings by numerals of reference, and more particularly to FIG. 1, there is shown a plastic film unwind stand 1 having a pair of rolls 2 and 3 of plastic film arranged for feeding film to a printing press for printing and for application of a laminating adhesive. Printing press 4 includes rotary drum 5 and has a plurality of printing stations 6, 7, 8, and 9 with intermediate dryers 10, 11, and 12 arranged to dry the imprint from each previous printing station. The printing stations are shown diagrammatically as including a container or well 13 for the printing ink or laminating adhesive and a train of printing rollers 14 arranged to transfer ink in the desired imprint to the film being passed around printing drum 5.

In the arrangement shown in FIG. 1, film 3 is polyethylene, which may be saran coated on one side if desired, and which has the surface adjacent to printing drum 5 oxidized or irradiated or otherwise treated to render it receptive to printing inks or adhesives. The film 2 leaving the roll is of a dimensionally stable film material, such as nylon, Mylar (polyester), cellophane, polypropylene, etc., which may have a saran coating on the surface of the film which contacts film 3 as it is fed past roller 15 at the input end of the printer. As the two plies of film are fed around printing drum 5, the outer film, viz, the nylon, Mylar, cellophane, or polypropylene, is printed at the successive printing station 6, 7, and 8 and the imprints dried by dryer units 10, 11, 12. At the last printing station 9, an adhesive coating is imprinted over the entire surface of the outer film ply. The adhesive which is applied at this station is a pressure-sensitive adhesive which is rendered dry to the touch when the films are passed through dryer 16. The adhesive which is used is one which is pressure sensitive but curable on extended storage at room temperature or may be cured by storage at a slightly elevated temperature for short periods of time. A preferred adhesive which is used in this laminating process is a mixture of a polyester consisting essentially of polyethylene terephthalate, modified with maleic anhydride and tall oil additives, and a polymeric polyisocyanate, preferably a polyurethane isocyanate. Adhesives of this general composition are provided as adhesive concentrates and also as solutions and solvents such as toluene, methylethylketone, acetone, or ethyl acetate. Adhesives of the preferred composition are Mondur, polyisocyanate adhesive (manufactured by Mobay Chemical Company), Marlon polyesterpolyisocyanate adhesive (manufactured by The Marlon Company), and Polybond adhesive (manufactured by Polymer Industries Inc.). Adhesives of this type are well known in the prior art and are described in U.S. Pat. No. 3,371,002. These adhesives when applied to film 2 in the printing press produce a transparent, slightly tacky, pressure sensitive coating over the entire film. The adhesive layer is of sufficient transparency that the resulting film laminate is optically clear.

After the film plies 2 and 3 have been printed and provided with an adhesive coating 17, the film plies are passed through dryer 16 where the adhesive coating is dried and rendered largely tack free. The film plies then pass over roller 18 and press roller 19 and are wound on reel 20 under a slight pressure exerted by press roll 19. As the film plies are wound on reel 20, sufficient pressure is applied by press roll 19 and by the tension of winding the films on the reel to ensure a very tight contact between adhesive layer 17 on film 2 and the outer (oxidized or treated) surface of film 3 with which the adhesive is contacted as the films are wound on reel 20.

Where the film is completely wound on reel 20, as shown in FIGS. 1 and 2, the outermost loop of film 3 is not adhered to any other film. This loop of film 3 would normally be unwound and cut off. Then when the ends of films 2 and 3 are subsequently unwound for use, those films are tightly laminated together with film 3 protecting the imprint or design laid down at the printing stations 6, 7, and 8 on printing press 4. When this process is used for preparing a cover film laminate which carries no imprint, only printing station 9 on printing press 4 is used for laying down a uniform layer of the pressure sensitive adhesive used in forming the desired film laminate. In such a case, a clear laminated film is obtained. These laminated films are used in the formation of packages by vacuum-forming techniques and other packaging techniques and are easily heat sealed. When these films are used for formation of packages, the polyethylene surfaces of the adjacent films are brought together in the formation of the package and the peripheral areas of contact are heat sealed using any conventional heat-sealing apparatus.

Figure 3:
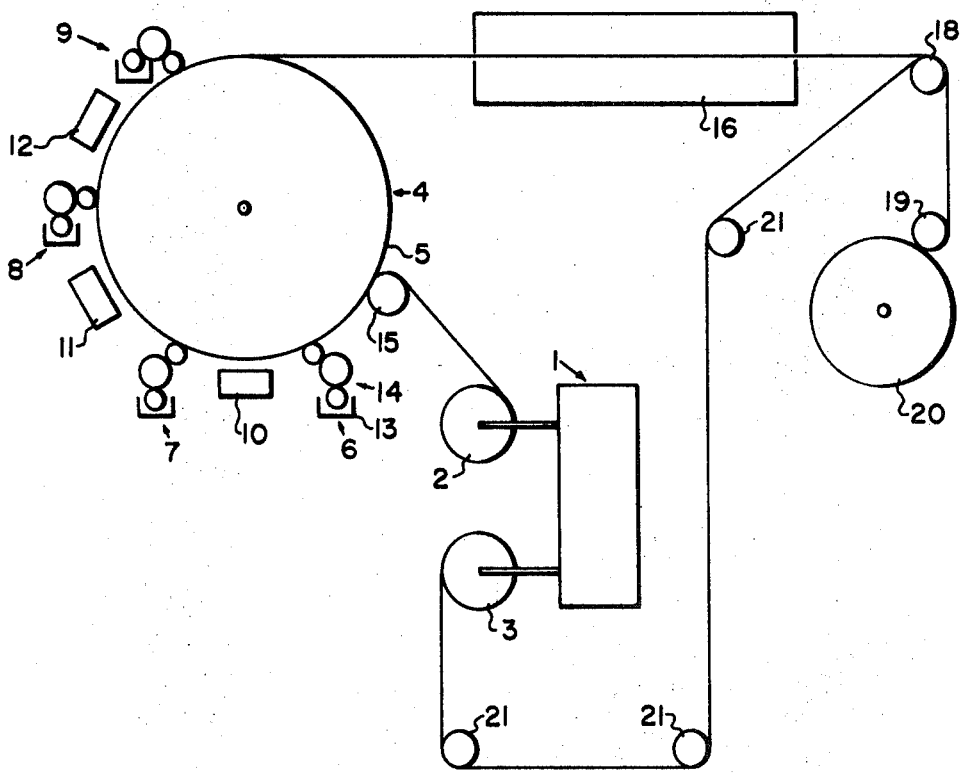
FIG. 3 is a schematic view of an alternate preferred embodiment of the invention in which one film ply has a laminating adhesive applied on a printing press and another film ply combined with the printed ply on the storage reel.
Figure 4:
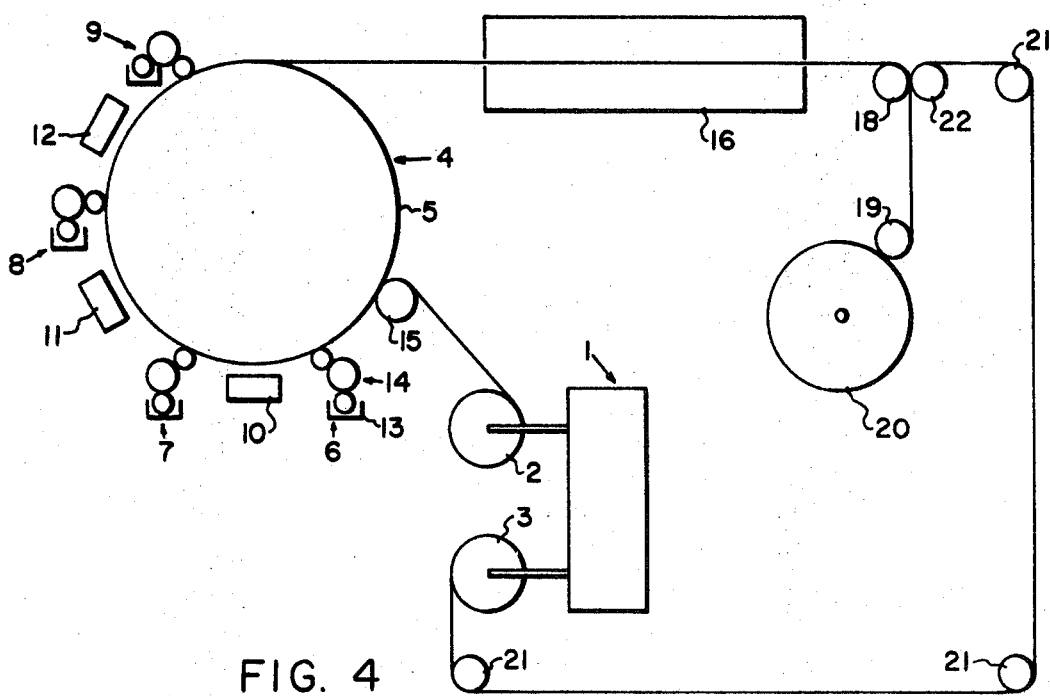
FIG. 4 is a schematic view of still another preferred embodiment of this invention in which one film ply has a laminating adhesive applied on a printing press and another film ply combined with the adhesive coated film prior to winding on the storage reel.

In carrying out the process described in FIGS. 1 and 2, it is necessary that the film plies passing through dryer 16 be moved at a sufficient speed or the dryer operated at sufficiently low temperature that the heat sealable film 3 (e.g. polyethylene) will not shrink. If the dryer temperature is too high or if the film has a residence time in the dryer sufficient that film 3 is heated above the shrinkage temperature, the film laminate will wrinkle badly as a result of shrinkage or distortion of the heat-sealable film 3. In FIGS. 3 and 4 of the drawing, there is shown schematically an alternate preferred embodiment of the invention which avoids the problem of heat sensitivity of the heat-sealable film in forming the film laminate.

In the apparatus and process shown in FIG. 3, the various steps of the process and the various components of the apparatus are essentially as shown and described in FIG. 1 except that the film plies are combined after the printed and adhesive-coated film leaves the dryer. In the schematic drawing shown in FIG. 3, the various components of the apparatus are given the same reference numerals as in FIG. 1. In the embodiment of the invention shown in FIG. 3, however, plastic film 3 is fed through the printing press alone and is printed and finally overcoated with adhesive at printing station 9. The printed and adhesive-overcoated film is then passed through the dryer 16 as in the embodiment shown in FIG. 1. The heat-sealable film 2 is fed over rolls 21 and finally combined with film 3 at roller 18. After the films pass over rollers 18, the adhesive coating is still to the outside of film 3. The two films then pass around press roller 19 and are wound up on reel 20 as in the embodiment described in FIG. 1. As the films are wound up on reel 20, they are adhesively laminated with the result that the adhesive is eventually cured, either by extended storage at room temperature or a shorter storage at slightly elevated temperature, thereby producing an optically clear film laminate having printing located between the dimensionally stable film 3 and the heat-sealable film 2.

Figure 5:
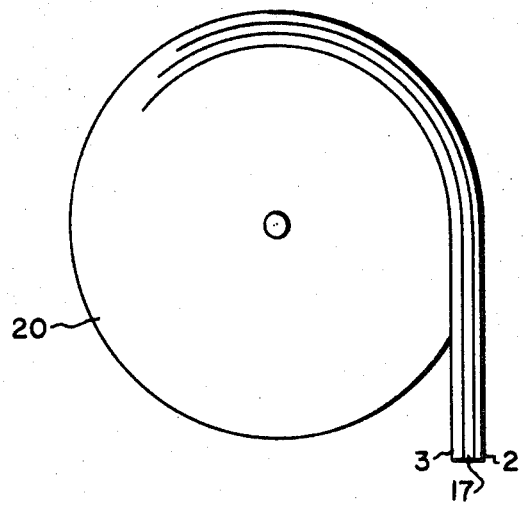
FIG. 5 is a detail end view of the storage reel of the process and apparatus shown in FIG. 4 and illustrates the relationship of the laminated plies.

In FIGS. 4 and 5 of the drawing, there is shown still another alternate embodiment of this invention. In this form of the invention, the dimensionally stable film 2 is fed through the printing press as in the form of the invention shown in FIG. 3. The film is printed, if desired, at the various stations and is finally overcoated with a pressure-sensitive adhesive at printing station 9 as described for FIGS. 1 and 3. The film then passes through dryer 16 and over roll 18. The heat-sealable film 3 is fed over rolls 21 and press roll 22 where the film 3 contacts adhesive coating on film 2 and the lamination is first effected. The adhesively laminated films then pass around press roll 19 and are wound on reel 20. The pressure of press roll 22 and 19 and the tension of the films when wound on reel 20 are effective to cause sufficient laminating pressure so that when adhesive coating 17 is cured, a good laminated film is obtained. In FIG. 5, the laminated films are shown in more detail with the adhesive layer 17 positioned between films 2 and 3 as they are wound on reel 20.

While we have described this invention fully and completely with special emphasis upon several preferred embodiments, we wish it to be understood that within the scope of the appended claims this invention may be practiced otherwise than as specifically described herein.

We claim:

1. A method of laminating a heat-resistant, dimensionally stable plastic film to an easily fuseable heat-sealable plastic film which comprises
   a. unwinding said heat-resistant film from a first storage reel,
   b. advancing said heat-resistant plastic film through a film-printing press and applying a coating of a transparent pressure-sensitive curable adhesive thereon,
   c. advancing the coated film through a heated dryer to dry and partially cure the adhesive coating thereon,
   d. unwinding said heat-sealable film from a second storage reel, and
   e. combining the adhesive-coated film with said heat-sealable film and winding the combined films under tension on a third storage reel, whereby an optically clear laminate is obtained after said adhesive layer has cured.

2. A method in accordance with claim 1 in which the heat resistant film is imprinted with a design or legend in the printing press and the imprint dried prior to application of said adhesive.

3. A method in accordance with claim 1 in which said heat-resistant film is fed through said printing press and dryer alone and is combined with said heat-sealable film at said third storage reel.

4. A method in accordance with claim 1 in which said heat-resistant film is nylon, polyester, polypropylene, or cellophane.

5. A method in accordance with claim 3 in which said heat-sealable film is polyethylene.

6. A method in accordance with claim 4 in which at least one of said films has a saran coating.

7. A method in accordance with claim 4 in which said adhesive is a polymeric isocyanate-polyester adhesive.

8. A method in accordance with claim 1 in which said heat-resistant film and heat-sealable film are fed together through the printing press and dryer and wound on said third storage reel to effect a lamination between said adhesive-coated heat-resistant film and said sealable film as said combined films are wound.

9. A method in accordance with claim 8 in which said heat-resistant film is nylon, polyester, polypropylene, polyethylene, polyvinyl chloride, or cellophane, and said heat-sealable film is polyethylene.